(12) United States Patent
McDonald

(10) Patent No.: US 8,965,699 B2
(45) Date of Patent: Feb. 24, 2015

(54) SYSTEMS AND METHODS FOR CHARACTERIZING TURBULENCE REGIONS

(75) Inventor: James Arthur McDonald, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 454 days.

(21) Appl. No.: 13/081,757

(22) Filed: Apr. 7, 2011

(65) Prior Publication Data
US 2012/0259549 A1   Oct. 11, 2012

(51) Int. Cl.
*G06F 19/00* (2011.01)
*G01W 1/00* (2006.01)

(52) U.S. Cl.
CPC ........... *G01W 1/00* (2013.01); *G01W 2001/003* (2013.01)
USPC .............................................................. 702/3

(58) Field of Classification Search
CPC ........................... G01W 1/00; G01W 2001/003
USPC ..................................................... 702/3
See application file for complete search history.

(56) References Cited

U.S. PATENT DOCUMENTS

| 5,541,591 | A  | * | 7/1996  | Bush ............................ 340/968 |
| 6,184,816 | B1 | * | 2/2001  | Zheng et al. ................. 342/26 R |
| 6,330,483 | B1 | * | 12/2001 | Dailey ........................... 700/28 |
| 7,598,901 | B2 |   | 10/2009 | Tillotson et al. |
| 7,880,666 | B2 |   | 2/2011  | Tillotson et al. |
| 8,130,121 | B2 | * | 3/2012  | Smith et al. ................... 340/945 |
| 2002/0039072 | A1 |   | 4/2002  | Gremmert |
| 2006/0121893 | A1 | * | 6/2006  | Tillotson et al. .............. 455/431 |

* cited by examiner

*Primary Examiner* — Edward Raymond
(74) *Attorney, Agent, or Firm* — Fogg & Powers LLC

(57) ABSTRACT

Systems and methods for characterizing regions of turbulence are provided. In one implementation, a method includes: measuring turbulence with an inertial reference unit on an aircraft to acquire a turbulence measurement; recording a position of the aircraft associated with the turbulence measurement and the turbulence measurement on at least one memory device; processing the turbulence measurement on a processing unit to determine a turbulence intensity setting; determining a turbulence region for the recorded position; associating the turbulence region with the turbulence intensity setting; and transmitting the turbulence intensity setting and the associated turbulence region.

19 Claims, 6 Drawing Sheets

US 8,965,699 B2

SYSTEMS AND METHODS FOR CHARACTERIZING TURBULENCE REGIONS

BACKGROUND

Commercial aircraft flights try to avoid areas of severe turbulence as turbulence has a negative impact on passenger comfort, passenger safety, and equipment/airframe integrity. Systems, using sensors, try to forecast and predict areas of strong/severe turbulence based on the sensing of atmospheric conditions. Also, when an airplane passes through areas with turbulence, pilots communicate verbal reports about the turbulence which are then passed along through air traffic control or the airline's control center. Improved accuracy for characterizing turbulence would allow commercial aircraft an improved probability of avoiding severe turbulence as well as minimizing unnecessary and/or inefficient avoidance maneuvers.

SUMMARY

In one embodiment, systems and methods for characterizing regions of turbulence are provided. In one implementation, a method includes: measuring turbulence with an inertial reference unit on an aircraft to acquire a turbulence measurement; recording a position of the aircraft associated with the turbulence measurement and the turbulence measurement on at least one memory device; processing the turbulence measurement on a processing unit to determine a turbulence intensity setting; determining a turbulence region for the recorded position; associating the turbulence region with the turbulence intensity setting; and transmitting the turbulence intensity setting and the associated turbulence region.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
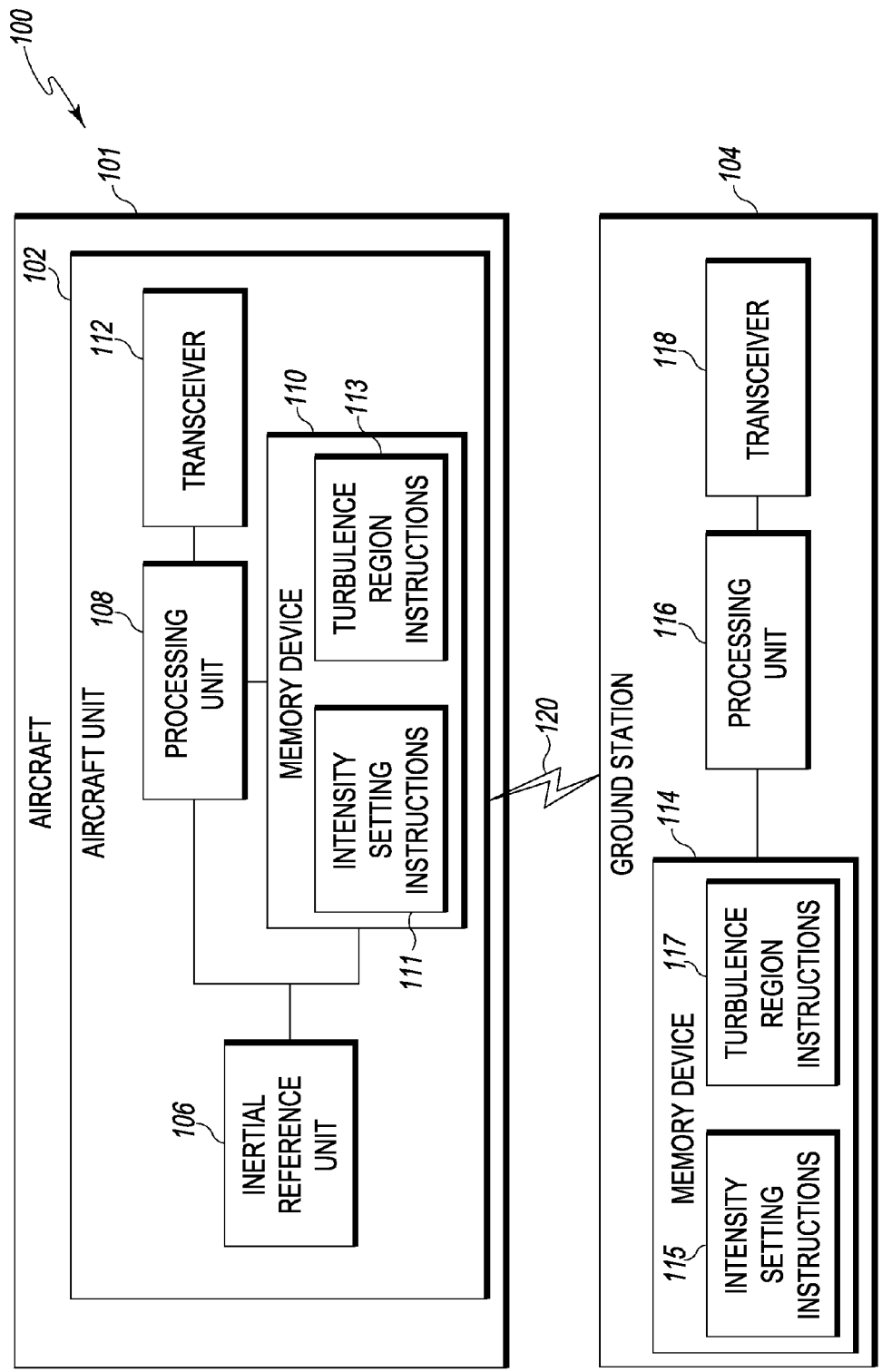
FIG. 1 is a block diagram of one embodiment of a system for characterizing turbulence.

In accordance with common practice, the various described features are not drawn to scale but are drawn to emphasize specific features relevant to the exemplary embodiments.

DETAILED DESCRIPTION

In the following detailed description, references are made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 illustrates a block diagram of a system 100 for characterizing turbulence regions. For example, system 100 includes an aircraft unit 102. Aircraft unit 102 is a system that resides on an aircraft 101 that measures turbulence. Aircraft 101 can be an airplane, a helicopter, and the like. Periodically, during flight, an aircraft can encounter regions of turbulence. As the aircraft move through regions of turbulence, the aircraft can move erratically in response to experienced turbulent forces. While turbulence can be light, turbulence can also severely damage an aircraft and injure people who may be on board the aircraft. To aid the aircraft in avoiding regions of turbulence, an aircraft 101 containing aircraft unit 102 moves through a region of turbulence. As aircraft 101 moves through the region of turbulence, aircraft unit 102 measures the movement of aircraft 101 to characterize the turbulence within the region.

To characterize the turbulence in a region, aircraft unit 102 includes an inertial reference unit 106. Inertial reference unit 106 includes inertial sensors, such as accelerometers and gyroscopes, that measure acceleration of aircraft unit 102. For example, inertial reference unit 106 measures changes in parameters such as heading, velocity, and attitude. As turbulence can cause unforeseen changes in heading, velocity, and attitude, inertial reference unit 106 produces turbulence measurements of the acceleration experienced by aircraft unit 102. The phrase "turbulence measurement," as used herein, refers to a measurement of acceleration by the inertial reference unit 106 in any one or more of heading, velocity, or attitude. Further, turbulence measurements may also refer to a measurement of the rate of change of acceleration in any one or more of heading, velocity, or attitude.

Aircraft unit 102 further includes a transceiver 112 which is configured to transmit turbulence measurements received from inertial reference unit 106. Transceiver 112 is a device capable of transmitting and receiving data over a communication link 120 with either a ground communication station or an airborne communication station. In one implementation, transceiver 112 functions as an automatic dependent surveillance-broadcast (ADS-B) transponder. When transceiver 112 functions as an ADS-B transponder, transceiver 112 periodically broadcasts the turbulence intensity information received from inertial reference unit 106 in conjunction with normal ADS-B parameters (longitude, latitude, and altitude) to other ground stations and aircraft with ADS-B equipment. As such, transceiver 112 broadcasts turbulence intensity information associated with a particular position. Alternatively, transceiver 112 transmits the turbulence measurements received from inertial reference unit 106 and position information associated with the turbulence intensity information by other communication links In some implementations, aircraft unit 102 transmits the measurements received from inertial reference unit 106 to a ground station 104 over communication link 120. Ground station 104 collects turbulence measurements and associated positions from multiple aircraft units 102 and computes three-dimensional regions of varying turbulence intensity. For example, ground station 104 receives turbulence measurements and an associated position from aircraft unit 102 on a transceiver 118. From the turbulence measurement and associated position, ground station 104 determines turbulence levels at the position of aircraft 101 carrying aircraft unit 102.

To determine the turbulence level, ground station 104 includes a processing unit 116. Processing unit 116 includes at least one processor that accepts data and performs mathematical and logical operations. Processing unit 116 includes or functions with software programs, firmware, or other computer readable instructions for carrying out various methods, process tasks, calculations, and control functions used in implementing the functionality described below. These instructions are typically stored on any appropriate computer or machine readable medium used for storage of computer readable instructions or data structures, such as memory device 114. For example, memory device 114 stores computer readable instructions such as intensity setting instructions 115 and turbulence region instructions 117. Further, aircraft unit 102 can also include a processing unit 108 that functions similarly to processing unit 116 as described below.

Memory device 114 includes at least one device that can hold data in a machine readable medium. The machine readable medium can be implemented as any available media that can be accessed by a general purpose or special purpose computer or processor, or any programmable logic device. Suitable machine or processor readable media may include storage/memory media such as magnetic or optical media. For example, storage/memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor readable media may also include transmission media such as electrical, electromagnetic, or digital signals, conveyed via a communication medium such as a network and/or a wireless link. Further, aircraft unit 102 can also include a memory device 110 that functions similarly to memory device 114 as described below.

In some implementations, memory device 114 on ground station 104 stores the data received from aircraft unit 102. For example, ground station 104 stores the turbulence measurements received from aircraft unit 102. Ground station 104 also stores the position information of an aircraft unit 102 in memory device 114, where the position information describes the position (latitude, longitude, and altitude) of aircraft unit 102 when the turbulence measurements are gathered. In some implementations, ground station 104 stores multiple turbulence measurements from aircraft unit 102 in memory device 114, where the turbulence measurements are gathered over a period of time. Further, Ground station 104 stores the turbulence measurements and positions received from multiple aircraft. Processing unit 116 executes instructions that use the turbulence measurements and position information stored in memory device 114 to calculate and define turbulence intensity settings for turbulence regions. For example, memory device 114 stores intensity setting instructions 115 and turbulence region instructions 117. Likewise, memory 110 on aircraft unit 102 stores intensity setting instructions 111 and turbulence region instructions 113 on memory device 110.

In some implementations, aircraft unit 102 transmits information describing the size and mass of aircraft 101 where aircraft unit 102 resides. For example, when the aircraft is a small, light commuter aircraft such as a DHC-8, which weighs about 30,000 lbs (about 13,600 Kg), aircraft unit 102 transmits the aircraft weight through transceiver 112 to ground station 104. When ground station 104 receives the transmission containing the weight on transceiver 118, ground station 104 stores the received weight in memory 114 and associates, in memory 114, the weight with turbulence measurements received from aircraft unit 102. Processing unit 116 on ground station 104 uses the weight stored in memory 114 to determine the severity of the turbulence from the turbulence measurements. Further, aircraft unit 102 can transmit other information that may indicate how aircraft 101 will move when experiencing turbulence. For example, aircraft unit 102 can transmit information like wing span, length, profile, height, and the like.

When ground station 104 receives position information, size and weight information, and turbulence measurements from aircraft unit 102, ground station 104 stores the information in memory 114. Intensity setting instructions 115 instruct processing unit 116 to retrieve the turbulence measurements, and size and weight information from memory 114 to calculate a turbulence intensity setting. The phrase "turbulence intensity setting," as used herein refers to a standardized categorization of turbulence that is understood by pilots of other aircraft. For example, the Turbulence Reporting Criteria from Section 7-1-23 of the Federal Aviation Administration Aeronautical Information Manual describes standardized categories for turbulence and how the turbulence is classified into the categories. A table illustrating the turbulence reporting criteria is as follows:

| | Turbulence Reporting Criteria from Section 7-1-23 of Federal Aviation Administration Aeronautical Information Manual | | |
|---|---|---|---|
| Intensity | Aircraft Reaction | Reaction Inside Aircraft | Reporting Term-Definition |
| Light | Turbulence that momentarily causes slight, erratic changes in altitude and/or attitude (pitch, roll, yaw). Report as Light Turbulence;[1] or Turbulence that causes slight, rapid and somewhat rhythmic bumpiness without appreciable changes in altitude or attitude. Report as Light Chop. | Occupants may feel a slight strain against seat belts or shoulder straps. Unsecured objects may be displaced slightly. Food service may be conducted and little or no difficulty is encountered in walking. | Occasional-Less than $\frac{1}{3}$ of the time. Intermittent - $\frac{1}{3}$ to $\frac{2}{3}$. Continuous - More than $\frac{2}{3}$. |
| Moderate | Turbulence that is similar to Light Turbulence but of greater intensity. Changes in altitude and/or attitude occur but the aircraft remains in positive control at all times. It usually causes variations in indicated airspeed. Report as Moderate Turbulence;[1] or | Occupants feel definite strains against seat belts and shoulder straps. Unsecured objects are dislodged. Food service and walking are difficult. | NOTE 1. Pilots should report location(s), time (UTC), intensity, whether in or near clouds, altitude, type of aircraft and, when applicable, duration of turbulence. 2. Duration may be based on |

| Turbulence Reporting Criteria from Section 7-1-23 of Federal Aviation Administration Aeronautical Information Manual | | | |
|---|---|---|---|
| Intensity | Aircraft Reaction | Reaction Inside Aircraft | Reporting Term-Definition |
| | Turbulence that is similar to Light Chop but of greater intensity. It causes rapid bumps or jolts without appreciable changes in aircraft altitude or attitude. Report as Moderate Chop.[1] | | time between two locations or over a single location. All locations should be readily identifiable |
| Severe | Turbulence that causes large, abrupt changes in altitude and/or attitude. It usually causes large variations in indicated airspeed. Aircraft may be momentarily out of control. Report as Severe Turbulence.[1] | Occupants are forced violently against seat belts or shoulder straps. Unsecured objects are tossed about. Food service and walking are impossible | EXAMPLES: a. Over Omaha., 1232Z, Moderate Turbulence, in cloud, Flight Level 310, B707. |
| Extreme | Turbulence in which the aircraft is violently tossed about and is practically impossible to control. It may cause structural damage. Report as Extreme Turbulence.[1] | | b. From 50 miles south of Albuquerque to 30 miles north of Phoenix, 1210Z to 1250Z, occasional Moderate Chop, Flight Level 330, DC8. |

[1]High level turbulence (normally above 15,000 feet ASL) not associated with cumuliform cloudiness, including thunderstorms, should be reported as CAT (clear air turbulence) preceded by the appropriate intensity, or light or moderate chop.

Figure 2:
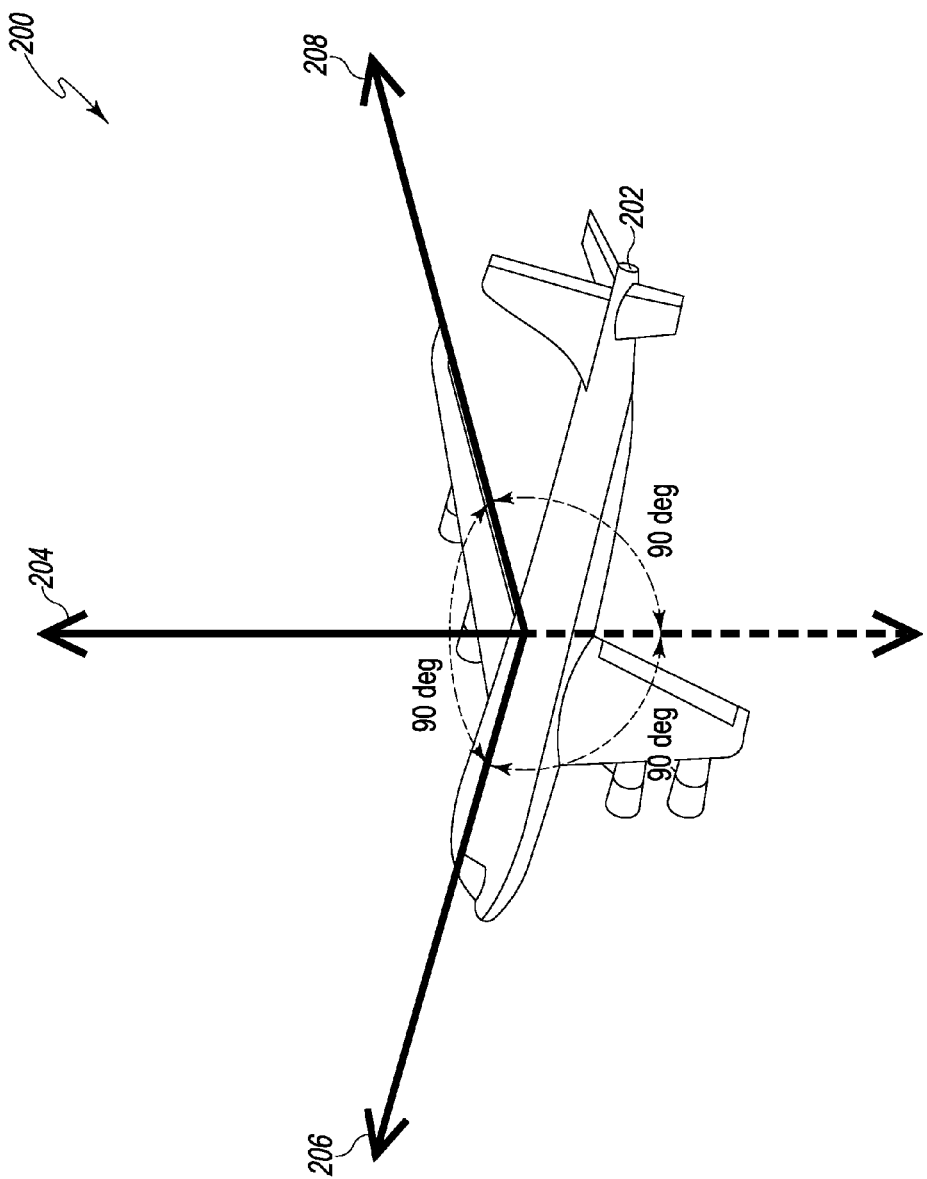
FIG. 2 is an illustration of a body frame of an inertial frame of reference for an aircraft according to one embodiment.

To calculate a turbulence intensity setting, intensity setting instructions 115 direct processing unit 116 to determine the jerk and acceleration of aircraft unit 102 at a particular position for aircraft unit 102. FIG. 2 is an illustration of a body frame of an inertial frame of reference 200 for an aircraft 202 containing aircraft unit 102. Inertial reference frame 200 is fixed and is oriented with respect to distant stars. Inertial sensors in inertial reference unit 106 in FIG. 1, which resides on aircraft 202, sense motion of the body frame with respect to the inertial reference frame 200. Aircraft 202 has a body frame fixed to the body of aircraft 202. When aircraft 202 experiences turbulence, the body frame of aircraft 202 can experience acceleration in velocity, attitude, or heading. Acceleration in velocity, attitude, and heading can be represented by the components of the acceleration along three orthogonal axes. For example, turbulence can cause aircraft to have components of acceleration in the direction of normal axis 204, longitudinal axis 206, and lateral axis 208. Intensity setting instructions 115 direct processing unit 116 to use the measurements of acceleration in the three axes and calculates a total acceleration for the body frame of aircraft 202.

In some implementations, processing unit 116, executing intensity setting instructions 115, uses the following equation to calculate the total acceleration for the body frame of aircraft 202 along normal axis 204, longitudinal axis 206, and lateral axis 208:

$$\underline{a}^B = \sqrt{a_x^2 + a_y^2 + a_z^2}$$

where $a_x$=Acceleration along longitudinal axis 206

$a_y$=Acceleration along lateral axis 208

$a_z$=Acceleration along normal axis 204

The total acceleration in the body frame $\underline{a}^B$ can be used in the calculation of turbulence intensity. Further, as memory 114 stores turbulence measurements representing multiple measurements from aircraft unit 102 over a period of time, intensity setting instructions 115 further instruct processing unit 116 to calculate the rate of change of the total acceleration in the body frame $\underline{a}^B$. Processing unit 116 calculates the rate of change of the total acceleration with respect to time, as the total jerk $\underline{j}$. The total jerk is computed via the following equation:

$$\underline{j} = \frac{d\underline{a}^B}{dt}$$

In at least one implementation, when processing unit 116 computes the total body acceleration and the total jerk, intensity setting instructions 115 direct processing unit 116 to compare the total body acceleration and the total jerk against turbulence level thresholds stored in memory 114. For example, memory 114 stores a look up table that contains turbulence level thresholds that correspond to the turbulence intensity settings of none, light, moderate, severe, and extreme. For each possible turbulence intensity setting, memory 114 stores an acceleration threshold value and a jerk threshold value. For example, for the turbulence intensity setting of none, memory 114 stores a value $A_{smooth}$ for the total acceleration and a value $J_{smooth}$ for the total jerk. Processing unit 116 retrieves the turbulence level thresholds and compares the calculated total body acceleration and the calculated total jerk against the turbulence level thresholds. For instance, when processing unit 116 retrieves the turbulence threshold values $A_{smooth}$ and $J_{smooth}$ from a look up table in memory 114, intensity setting instructions 115 direct processing unit 116 to determine if $\underline{a}^B \leq A_{smooth}$ or if $\underline{j} \leq J_{smooth}$. If processing unit 116 determines that the total body acceleration is less than the acceleration threshold value associated with no turbulence or the total jerk is less than the jerk threshold value associated with no turbulence, then processing unit 116 concludes that aircraft unit 102 was not experiencing turbulence at the time and position that the measurement was acquired by aircraft unit 102. The following table shows how the different turbulence intensity settings are determined from a look up table:

| Turbulence Intensity Look-Up Table | |
|---|---|
| Acceleration and Jerk Criteria | Turbulence Intensity Setting |
| $\underline{a}^B \leq A_{smooth} * W$ or $\underline{j} \leq J_{smooth} * W$ | None |
| $A_{smooth} * W < \underline{a}^B \leq A_{light} * W$ or $J_{smooth} * W < \underline{j} \leq J_{light} * W$ | Light |
| $A_{light} * W < \underline{a}^B \leq A_{moderate} * W$ or $J_{light} * W < \underline{j} \leq J_{moderate} * W$ | Moderate |

-continued

Turbulence Intensity Look-Up Table

| Acceleration and Jerk Criteria | Turbulence Intensity Setting |
|---|---|
| $A_{moderate} * W < \underline{a}^B \leq A_{severe} * W$ or $J_{moderate} * W < \underline{j} \leq J_{severe} * W$ | Severe |
| $A_{severe} * W < \underline{a}^B$ or $J_{severe} * W < \underline{j}$ | Extreme |

In some implementations, the turbulence level thresholds ($A_{smooth}$, $J_{smooth}$, $A_{light}$, $J_{light}$, $A_{moderate}$, $J_{moderate}$, $A_{severe}$, $J_{severe}$) vary in accordance with the weight of the aircraft. For example, a light commuter aircraft such as a DHC-8, weighing 30,000 lbs (about 13,600 Kg) experiences turbulence caused acceleration with a magnitude of 2 G, processing unit 116, executing intensity setting instructions 115, would determine that the turbulence intensity setting is moderate. Whereas, if an A380, which weighs over 1,000,000 lbs. (about 450,000 Kg), experienced turbulence caused acceleration with a magnitude of 2 G, processing unit 116, executing intensity setting instructions 115, would determine that the turbulence intensity setting is severe. In one implementation, to compensate for the differences in the weight of aircraft, executing intensity setting instructions 115 instruct processing unit 116 determines the turbulence level thresholds by taking a base threshold ($A_{smooth}$, $J_{smooth}$, $A_{light}$, $J_{light}$, $A_{moderate}$, $J_{moderate}$, $A_{severe}$, $J_{severe}$) and multiplying the base thresholds by a weight scalar W wherein the weight scalar adjusts the base thresholds in accordance with the weight of the aircraft, as shown in the above turbulence intensity look up table.

In some implementations, aircraft unit 102 provides multiple turbulence measurements gathered over a sampling period of time and transmits the turbulence measurements to ground unit 104. Ground unit 104 computes multiple total acceleration and total jerk from the multiple measurements received from aircraft unit 102, compares the multiple total acceleration and total jerk calculations against the turbulence level thresholds, and determines a final turbulence intensity over the sampling period during which samples were acquired. Processing unit 116, executing intensity setting instructions 115, determines the final turbulence intensity by analyzing the number of maximum intensity samples measured over the sampling period.

Figure 3:
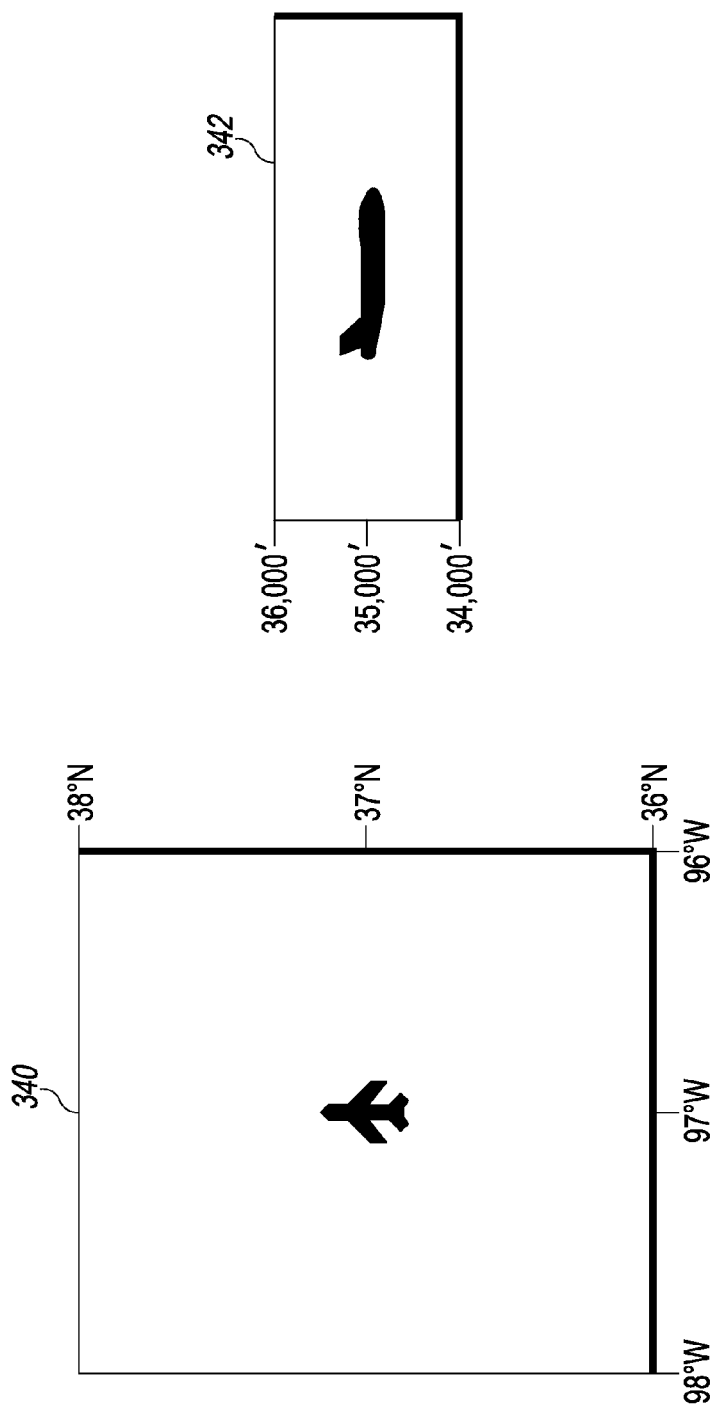
FIG. 3 is an illustration of a turbulence region centered on an aircraft position according to one embodiment.

As processing unit 116, executing intensity setting instructions 115, calculates turbulence levels using turbulence measurements received from aircraft unit 102, processing unit 116, executing turbulence region instructions 117, also calculates a turbulence region using the position of aircraft unit 102 associated with the time aircraft unit 102 measured the turbulence. In one implementation, turbulence region instructions 117 instruct processing unit 116 to center a turbulence region having a defined latitude, longitude, and altitude range over the position of aircraft unit 102. FIG. 3 illustrates a turbulence region centered around the position of an aircraft unit 102. The turbulence region is a three-dimensional area of space centered on the position of aircraft unit 102. Top view 340 shows the lateral dimensions of a turbulence region in terms of latitude and longitude. For example, if, at the time of the turbulence measurement, the position of aircraft unit 102 is 37 degrees north latitude, and 97 degrees west longitude as shown in the middle of top view 340, turbulence region instructions 117 direct processing unit 116 to define the lateral boundaries of the turbulence region as shown as 38 degrees north latitude, 36 degrees north latitude, 98 degrees west latitude, and 96 degrees west latitude. Side view 342 shows a side view of the altitudinal dimensions of the turbulence region. For example, if, at the time of the turbulence measurement, aircraft unit 102 was at 35,000 feet, turbulence region instructions 117 instruct processing unit 116 to define the altitudinal boundaries of the turbulence region as 36,000 feet and 34,000 feet. Thus, turbulence region instructions 117 direct processing unit 116 to define a region surrounding the position information associated with the turbulence measurement. As shown in FIG. 3, the turbulence region has a dimension of 2 degrees latitude, 2 degrees longitude and 2,000 ft of altitude around the position of aircraft unit 102 associated with the turbulence measurement. Alternatively, the dimensions of a turbulence region can be measured in miles, meters, feet, kilometers, and the like along with a wide range of magnitudes. Further, where FIG. 3 shows a turbulence region as a box, a turbulence region can also be defined to be a sphere, a cylinder, and the like. As such, if processing unit 116, executing intensity setting instructions 115, determines that aircraft unit 102 experienced light turbulence, processing unit 116 defines the turbulence as light over the entire turbulence region.

In an alternative implementation, processing unit 116 can define fixed turbulence regions over the entire globe. The phrase "fixed turbulence region," as used herein, refers to a region of airspace that is fixed in relation to the earth with a location that is independent of the location of any aircraft. For example, in one implementation, turbulence region instructions 117 direct processing unit 116 to define 40,898 turbulence regions that cover the entire globe. Each turbulence region is defined by a maximum and minimum longitude and a maximum and minimum latitude. Further each region contains a series of evenly spaced altitude bands. For example, a turbulence region contains 25 evenly spaced altitude bands that vary from zero feet to 50,000 feet in 2,000 feet increments.

Figure 4:
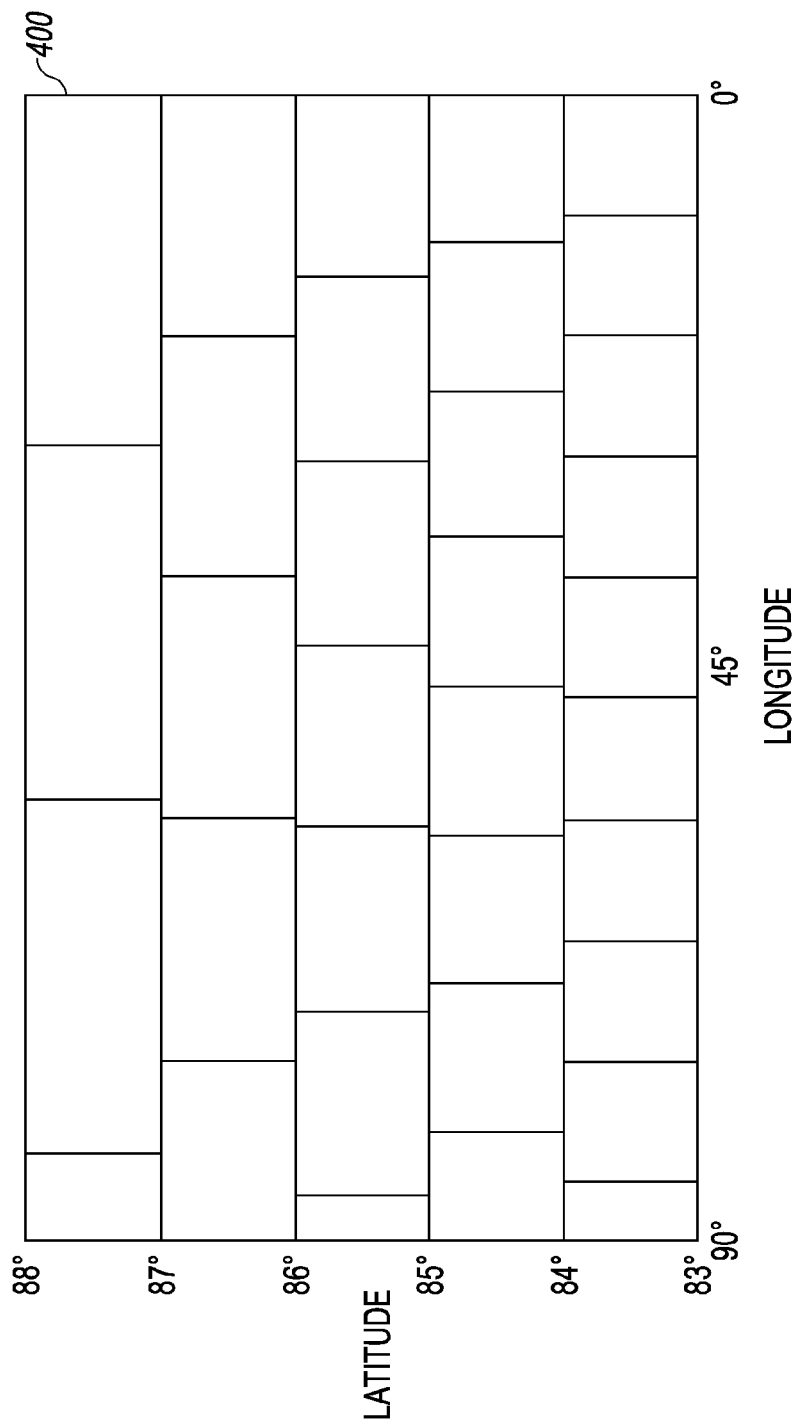
FIG. 4 is an illustration of turbulence regions having a fixed position according to one embodiment.

FIG. 4 illustrates the distribution of multiple fixed turbulence regions over a defined region 400 of the earth. Defined region 400 is a region over the earth that lies between 0 degrees west and 90 degrees west longitude and 83 degrees north and 88 degrees north latitude. Defined region 400 is divided into multiple turbulence regions, where each turbulence region has a maximum and minimum latitude and longitude. To calculate the maximum and minimum latitude and longitude of the turbulence regions, turbulence region instructions 117 direct processing unit 116 to define a grid over the Earth. As shown, the latitudinal boundaries between the turbulence regions in defined region 400 are set at each degree of latitude. For example, defined region 400 has latitudinal boundaries at 83, 84, 85, 86, 87, and 88 degrees. In some implementations, turbulence region instructions 117 instruct processing unit 116 to set the latitudinal boundaries in one degree increments over the entire range of latitude, from 90 degrees south to 90 degrees north. Alternatively, turbulence region instructions 117 direct processing unit 116 to set the boundaries at specific distances from a reference point. For example, a boundary can exist every multiple of 50 miles north and south of the equator.

To calculate the longitudinal boundaries, turbulence region instructions direct processing unit 116 to calculate evenly spaced longitude points on each maximum latitude boundary using the following equation:

$$\Delta\lambda = \frac{360}{\text{Round}\left(\frac{360}{\text{Minimum}\left(\frac{1 \text{ deg}}{\cos(\phi)}, 360\right)}\right)}$$

Where $\Delta\lambda$ = Longitude Step to be used at latitude $\phi$

For example, when ground station 104 receives a position of an aircraft that was flying between 85 degrees north and 86 degrees north. Turbulence region instructions direct processing unit 116 to defines evenly spaced longitudinal points along the latitudinal boundary for 86 degrees north. As shown in FIG. 4, defined region 400 contains longitudinal boundaries between the latitudes of 85 degrees north and 86 degrees north where the longitudinal boundaries are separated by 14.4 degrees longitude. The following table illustrates the Longitudinal boundaries between 86 degrees north and 85 degrees north:

Example of Turbulence Regions with Max/Min Latitude of 86/85 degrees North

| Region # | Max Latitude | Min Latitude | Max Longitude | Min Longitude |
|---|---|---|---|---|
| 1 | 86 | 85 | 14.4 | 0 |
| 2 | 86 | 85 | 28.8 | 14.4 |
| 3 | 86 | 85 | 43.2 | 28.8 |
| ... | 86 | 85 | ... | ... |
| 24 | 86 | 85 | 345.6 | 331.2 |
| 25 | 86 | 85 | 360 (same as 0) | 345.6 |

In some implementations, turbulence region instructions 117 direct processing unit 116 to define turbulence regions using a combination of the fixed turbulence regions and turbulence regions centered on the position of an aircraft. For example, turbulence region instructions 117 instruct processing unit 116 to define a first region as a fixed turbulence region, and a second region as a turbulence region centered on an aircraft position. When processing unit 116 calculates a turbulence region and the turbulence intensity setting for the calculated turbulence region. Processing unit 116 stores the turbulence region and associated turbulence intensity setting in memory 114. Further, processing unit 116 directs transceiver 118 to transmit information describing the turbulence region and associated turbulence intensity setting to other aircraft.

Figure 5:
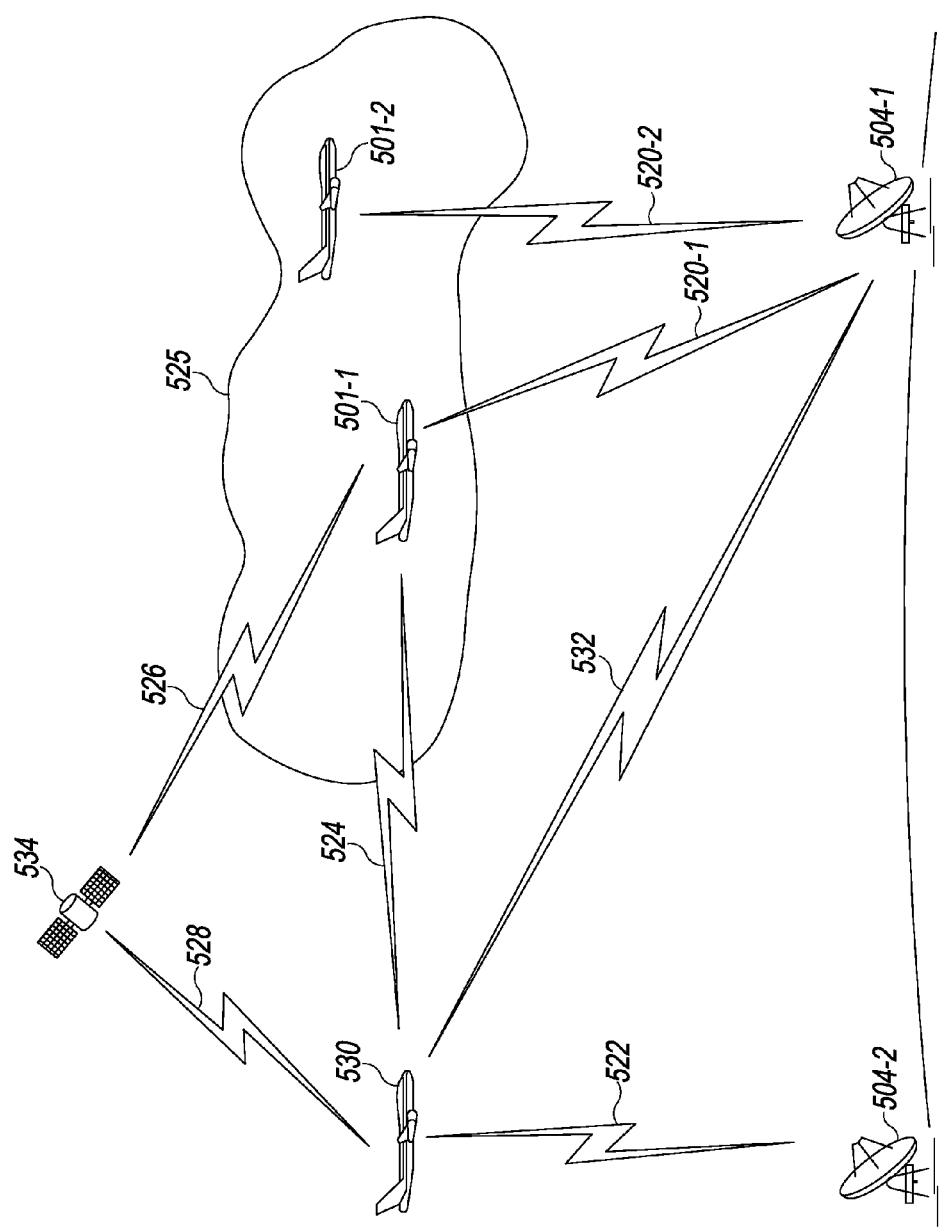
FIG. 5 is an illustration of aircraft communicating turbulence data through various communication links according to one embodiment.

FIG. 5 is a diagram of aircraft communicating turbulence measurements through several communication links For example, turbulence measuring aircraft 501-1 and 501-2 fly through turbulence 525 and measure the turbulence and record a position associated with turbulence measurements as described above. Turbulence measuring aircraft 501-1 and 501-2 transmit the turbulence measurements and position information to a ground station 504-1 over communication links 520-1 and 520-2. Upon reception of the turbulence measurements and associated position information, ground station 504-1 processes the turbulence measurements and associated position information as described above in relation to ground station 104 in FIG. 1 and determines a turbulence region and a turbulence intensity setting associated with the turbulence region. Further, ground station 504-1 transmits the turbulence region and the turbulence intensity setting associated with the turbulence region to non-measuring aircraft 530. Upon reception of the turbulence region and turbulence intensity setting associated with the turbulence region, non-measuring aircraft 530 determines whether the turbulence measured in the turbulence region poses a danger to non-measuring aircraft 530. If the turbulence poses a danger to non-measuring aircraft 530, non-measuring aircraft 530 takes evasive actions to avoid flying through the turbulence 525 in the defined turbulence region.

In some implementations, ground station 504-1 receives requests from non-measuring aircraft 530 for turbulence region information for specific turbulence regions. For example, when non-measuring aircraft 530 is equipped with ADS-B, non-measuring aircraft 530 periodically broadcasts position information to ground station 504-1 through communication link 532. Ground station 504-1 uses the received position information to determine turbulence region information for non-measuring aircraft 530 at the current position of non-measuring aircraft 530. The phrase "turbulence region information," as used herein, generally refers to information that describes turbulence regions that are pertinent to a moving vehicle that has a particular position and heading. For example, Ground station 504-1 transmits the current turbulence intensity setting and its accompanying turbulence region to non-measuring aircraft 530 along with the turbulence intensity settings associated with the turbulence regions through which non-measuring aircraft 530 is expected to travel.

In an alternative embodiment, turbulence measuring aircraft 501-1 and 501-2 includes a processing unit 108 and memory device 110 as shown in FIG. 1. Processing unit 108 and memory device 110 function to calculate the turbulence intensity setting and turbulence region as described above in relation to processing unit 116 and memory device 114. As such, when turbulence measuring aircraft 501-1 and 501-2 measure turbulence 525 through inertial reference unit 106, where both turbulence measuring aircraft 501-1 and 501-2 contain an aircraft unit 102, a processing unit 108 in an aircraft unit 102 executes intensity setting instructions 111 and turbulence region instructions 113 from memory device 110 to determine the turbulence intensity setting and current turbulence region of turbulence measuring aircraft 501-1 and 501-2. When turbulence measuring aircraft 501-1 and 501-2 determine the turbulence intensity setting and turbulence region, turbulence measuring aircraft 501-1 and 501-2 can transmit the turbulence intensity setting and turbulence region information to ground station 504-1, non-measuring aircraft 530, and/or satellite 534.

In one implementation, turbulence measuring aircraft transmit the turbulence intensity setting and turbulence region information to ground station 504-1. Ground station 504-1 relays the information received directly to non-measuring aircraft 530. However, non-measuring aircraft 530 may not be within range of ground station 504-1. When non-measuring aircraft 530 is out of range of ground station 504-1, ground station 504-1 relays the turbulence intensity setting and turbulence region information to non-measuring aircraft 530 via any one of satellite 534, ground station 504-2, and turbulence measuring aircraft 501-1 and 501-2. For example, ground station 504-1 can transmit the information to ground station 504-2, which transmits the information to non-measuring aircraft 530 over communication link 522. Alternatively, ground station 504-1 can transmit the information to turbulence measuring aircraft 501-1, which transmits the information to non-measuring aircraft 530 over communication link 524. Further, the information can be relayed to satellite 534 over communication link 526 and then relayed to non-measuring aircraft 530 over communication link 528. Alternatively, turbulence measuring aircraft 501-1 and 501-2 can transmit the information directly to non-measuring aircraft 530.

In some situations, when turbulence measuring aircraft 501-1 and 501-2 transmit a turbulence intensity setting or turbulence measurement, turbulence measuring aircraft 501-1 and turbulence measuring aircraft 501-2 may be travelling through the same turbulence region 525 and altitude band. As turbulence intensity varies throughout a turbulence region, turbulence measuring aircraft 501-1 and turbulence measuring aircraft 501-2 may produce conflicting turbulence intensity settings and information. When two or more aircraft within the same region and altitude band report conflicting turbulence intensity settings or information within a predefined period of time, the turbulence intensity setting representing the greatest risk to aircraft is selected to represent the turbulence intensity within the turbulence region. For example, turbulence measuring aircraft 501-1 transmits a turbulence intensity setting of severe turbulence to ground station 504-1, while turbulence measuring aircraft 501-2 transmits a turbulence intensity setting of light turbulence to ground station 504-1 within the predefined period of time. As the turbulence intensity settings received from turbulence measuring aircraft 501-1 and turbulence measuring aircraft 501-2 conflict and were both received within a predefined period of time, ground station 504-1 transmits the higher turbulence intensity setting of severe turbulence to non-measuring aircraft 530.

As turbulence regions are constantly changing, a turbulence intensity setting for a turbulence region becomes stale. A turbulence intensity setting becoming stale indicates that enough time has passed since the moment when the turbulence in the turbulence region was measured that the turbulence intensity setting is likely to be inaccurate for the turbulence region. To avoid the transmission of stale turbulence intensity settings, when either memory device 110 on turbulence measuring aircraft 501-1 and 501-2 or memory device 114 in ground station 504-1 stores a turbulence intensity setting, the turbulence intensity setting is stored with the time that the turbulence intensity setting was acquired. If a predefined period of time has passed since the turbulence intensity setting was acquired, either turbulence measuring aircraft 501-1 and 501-2 or ground station 504-1 will transmit a "no report" for the turbulence intensity setting of the turbulence region. For example, turbulence measuring aircraft 501-1 and 501-2 measure the turbulence intensity and transmit turbulence intensity information to ground station 504-1 at a first time. Ground station 504-1 calculates the turbulence intensity setting from the received turbulence intensity information and stores the turbulence intensity setting along with the time that the turbulence intensity information was acquired by turbulence measuring aircraft 501-1 and 501-2 in memory 114. After a period of time has passed that exceeds the predefined period of time for turbulence intensity setting to become stale, non-measuring aircraft 530 requests a turbulence intensity setting from ground station 504-1. As the measurement of the turbulence intensity has become stale, ground station 504-1 transmits a turbulence intensity setting of "no report" to non-measuring aircraft 530.

Turbulence measuring aircraft 501-1 and 501-2 and ground station 504-1 are capable of compiling turbulence measurements gathered from inertial reference unit 106 in FIG. 1 when turbulence measuring aircraft 501-1 and 501-2 fly through turbulence 525. When turbulence measuring aircraft 501-1 and 501-2 and ground station 504-1 compile turbulence intensity information, turbulence measuring aircraft 501-1 and 501-2 and ground station 504-1 determine a turbulence intensity setting and turbulence region that describes the turbulence measurements received from inertial reference unit 106. After determining the turbulence intensity setting, turbulence measuring aircraft 501-1 and 501-2 and ground station 504-1 distribute the acquired information to other aircraft, such as non-measuring aircraft 530, so that the other aircraft can avoid potentially dangerous turbulence.

Figure 6:
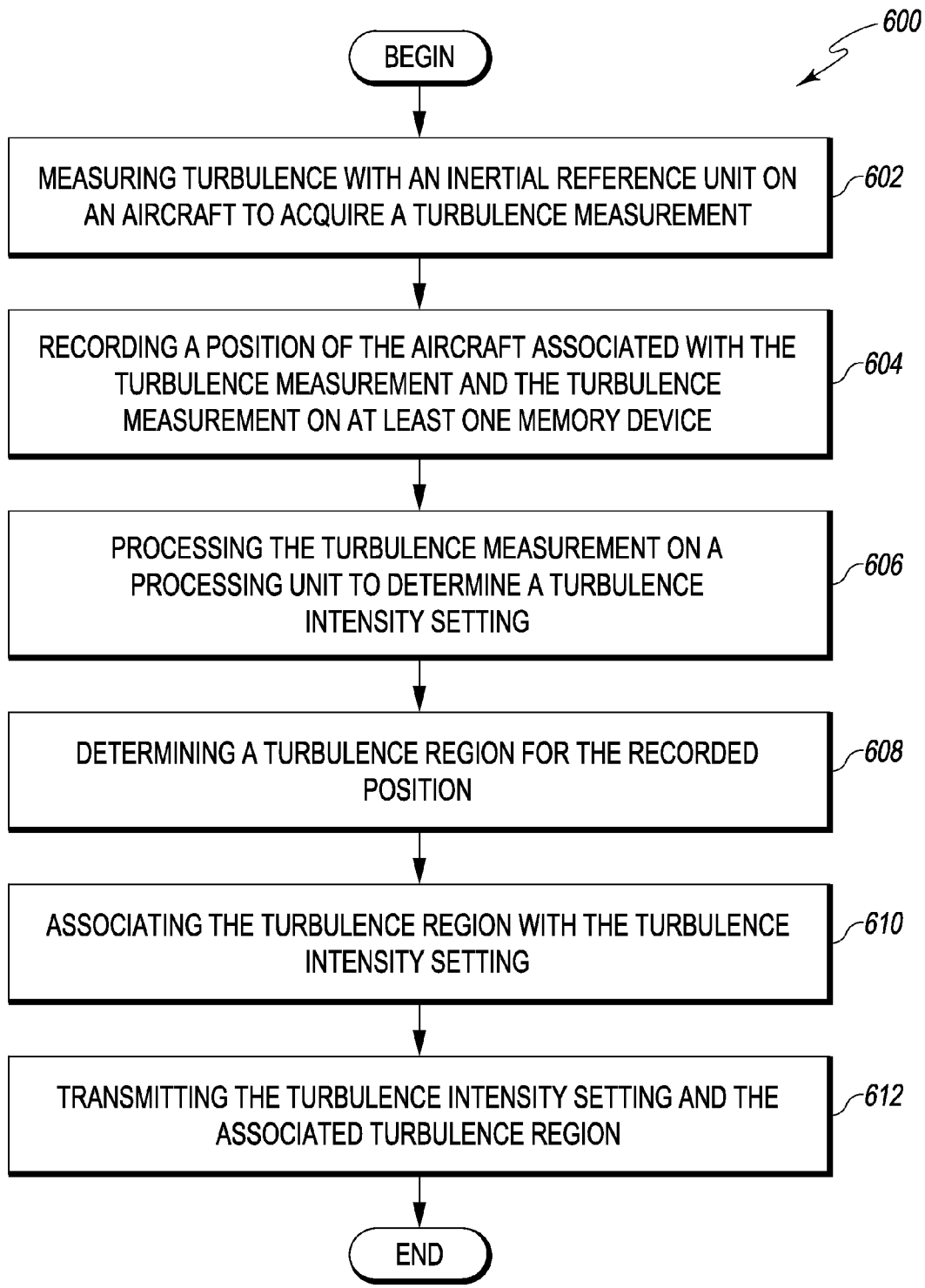
FIG. 6 is a flow diagram of one embodiment of a method for characterizing turbulence.

FIG. 6 is a flowchart of a method 600 for characterizing regions of turbulence. At block 602, turbulence is measured with an inertial reference unit on an aircraft to acquire a turbulence measurement. For example, an inertial reference unit contains gyroscopes and accelerometers configured to measure motion of the aircraft. When the aircraft experiences turbulence, the motion of the airplane is measured by the inertial reference unit. At block 604, a position of the aircraft associated with the turbulence measurement and the turbulence measurement is recorded on at least one memory device. For example, the aircraft transmits a position of the aircraft associated with the turbulence measurement to a ground station. Upon reception, the ground station stores the position of the aircraft and the turbulence measurement in a memory device. At block 606, the turbulence measurement is processed on a processing unit to determine a turbulence intensity setting. For example, a ground station or an aircraft can determine that the turbulence intensity setting is one of none, light, moderate, severe or extreme by processing the turbulence measurement on a processing unit.

At block 608, a turbulence region for the recorded position is determined. For example, the aircraft or ground station uses the recorded position of the aircraft at the time the turbulence intensity information was gathered to identify a turbulence region, the turbulence region being a defined region of airspace through which the aircraft was passing through when the aircraft experienced the turbulence. At block 610, the turbulence region is associated with the turbulence intensity setting. For example, after defining a turbulence region, the processing unit sets the turbulence intensity setting for the entire turbulence region to the determined intensity setting. At block 612, the turbulence intensity setting and turbulence region information is transmitted. For example, after determining the turbulence intensity setting and identifying the turbulence region, either an aircraft or a ground station can transmit the turbulence intensity setting and information describing the turbulence region to other aircraft. The other aircraft upon receiving the turbulence identity setting and turbulence region information can determine whether the turbulence poses a danger and, if the turbulence poses a danger, change a flight path to avoid the turbulence region.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed:
1. A method for characterizing regions of turbulence, the method comprising:
   measuring turbulence with an inertial reference unit on an aircraft to acquire a turbulence measurement;
   recording a position of the aircraft associated with the turbulence measurement and the turbulence measurement on at least one memory device;
   processing the turbulence measurement on a processing unit to determine a turbulence intensity setting;
   determining a turbulence region for the recorded position, wherein the turbulence region is a three dimensional defined volume containing the aircraft, wherein the boundaries of the three dimensional defined volume are fixed in relation to the earth and defined independently of the position;
   associating the turbulence region with the turbulence intensity setting such that the turbulence within the turbulence region is characterized by the turbulence intensity setting; and
   transmitting the turbulence intensity setting and the associated turbulence region.

2. The method of claim 1, wherein determining a turbulence intensity setting from the turbulence measurement comprises:
   calculating a total acceleration of the aircraft and a total jerk of the aircraft from the turbulence measurement; and
   comparing the total acceleration of the aircraft and total jerk of the aircraft against a turbulence level threshold.

3. The method of claim 2, wherein the turbulence intensity threshold comprises a plurality of thresholds, wherein the plurality of thresholds are used to determine whether the turbulence intensity setting is at least one of none, light, moderate, severe, and extreme.

4. The method of claim 3, wherein the plurality of thresholds are calculated as a function of the mass of the aircraft.

5. The method of claim 1, wherein the turbulence measurement is acquired by measuring turbulence over a period of time.

6. The method of claim 1, further comprising:
   recording a plurality of turbulence measurements at a plurality of aircraft positions; and
   determining a turbulence region from the plurality of turbulence measurements and the plurality of aircraft positions.

7. The method of claim 1, wherein the turbulence region is defined by at least one of:
   the aircraft; and
   a ground station that received the turbulence intensity setting from the aircraft.

8. The method of claim 1, wherein transmitting the turbulence intensity setting and the associated turbulence region comprises transmitting the turbulence intensity setting and the associated turbulence region to a second aircraft.

9. The method of claim 8, wherein the second aircraft alters its flight path to avoid the turbulence region.

10. A system for characterizing turbulence regions, the system comprising:
   an inertial reference unit configured to measure turbulence experienced by an aircraft;
   at least one memory device configured to:
   store a turbulence measurement; and
   record position information of the aircraft associated with the measured turbulence;
   a processing unit configured to determine a turbulence intensity setting from the turbulence measurement and determine a turbulence region from the position information associated with the turbulence measurement such that the turbulence within the turbulence region is characterized by the turbulence intensity setting, wherein the turbulence region is a three dimensional defined volume containing the aircraft, wherein the boundaries of the three dimensional defined volume are fixed in relation to the earth and defined independently of the position information; and
   a transceiver configured to transmit the turbulence intensity setting and turbulence region information, the turbulence region information describing the turbulence region.

11. The system of claim 10, wherein the processing unit is configured to determine the turbulence intensity setting by:
   calculating a total acceleration;
   calculating a total jerk; and
   determining the turbulence intensity setting by comparing the total acceleration and total jerk against a turbulence level threshold.

12. The system of claim 11, wherein the turbulence intensity threshold comprises a plurality of thresholds, wherein the plurality of thresholds are used to determine whether the turbulence intensity setting is at least one of none, light, moderate, severe, and extreme.

13. The system of claim 12, wherein the processing unit calculates the plurality of thresholds as a function of the mass of the aircraft.

14. The system of claim 10, wherein the transmission unit transmits to at least one of:
   a ground station, wherein the ground station transmits the turbulence intensity setting and turbulence region information to other aircraft; and
   a second aircraft.

15. The system of claim 10, wherein, upon determining a first turbulence intensity setting based on a first turbulence measurement received from a first aircraft and determining a second turbulence intensity setting based on a second turbulence measurement received from a second aircraft, the first and second turbulence measurements being associated with a same turbulence region and the first turbulence intensity setting is different from the second turbulence intensity setting, the processing unit selects the turbulence intensity setting that poses a greater danger to an aircraft.

16. The system of claim 10, wherein the transmission unit stops transmitting turbulence intensity settings and turbulence region information for the turbulence region after a predefined period of time passes after the turbulence measurements and position information used to determine the turbulence intensity settings were stored in the memory device.

17. A program product comprising a non-transitory processor-readable medium on which program instructions are embodied, wherein the program instructions are configured, when executed by at least one programmable processor, to cause the at least one programmable processor to:
   receive a turbulence measurement and position data of a first aircraft from the first aircraft, the turbulence measurement describing the motion of the aircraft and the position data being associated with the turbulence measurement,
   store the turbulence measurements and position data on at least one memory device;
   determine a turbulence intensity setting from the turbulence measurement;
   determine a turbulence region from the stored position data, wherein the turbulence region is a three dimensional area containing the first aircraft, wherein the three dimensional defined volume is centered on a location indicated by the position data of the first aircraft;
   associate the turbulence region with the turbulence intensity setting such that the turbulence within the turbulence region is characterized by the turbulence intensity setting; and
   transmit the turbulence intensity setting and the associated turbulence region to a second aircraft.

18. The program product of claim 17, wherein the program instructions are further configured to cause at least one programmable processor to:
   receive a plurality of turbulence measurements at a plurality of aircraft positions of the first aircraft; and
   determine a turbulence region from the plurality of turbulence measurements and the plurality of aircraft positions.

19. The program product of claim 17, wherein the program instructions are configured to cause at least one programmable processor to determine a turbulence intensity setting from the turbulence measurement by causing at least one programmable processor to:

calculate a total movement measurement from the turbulence measurement; and compare the total movement measurement against a turbulence intensity threshold.

* * * * *